April 19, 1955   R. E. CALDWELL   2,706,465
LIVESTOCK OILER AND APPLICATOR APPARATUS
Filed March 18, 1953   3 Sheets-Sheet 1

INVENTOR.
Robert E. Caldwell
BY
Fishburn + Mullendore
ATTORNEYS.

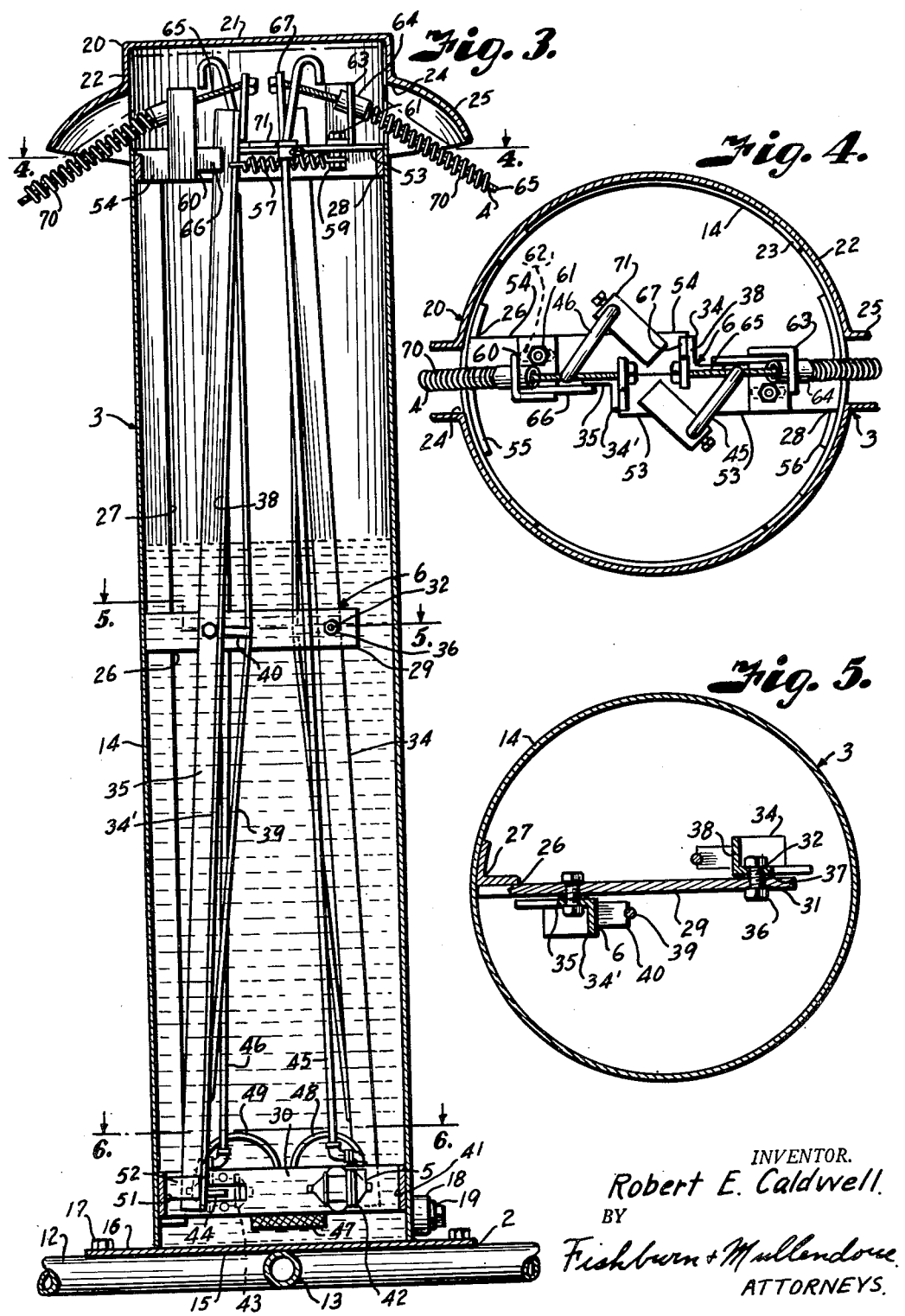

April 19, 1955   R. E. CALDWELL   2,706,465
LIVESTOCK OILER AND APPLICATOR APPARATUS
Filed March 18, 1953   3 Sheets-Sheet 3
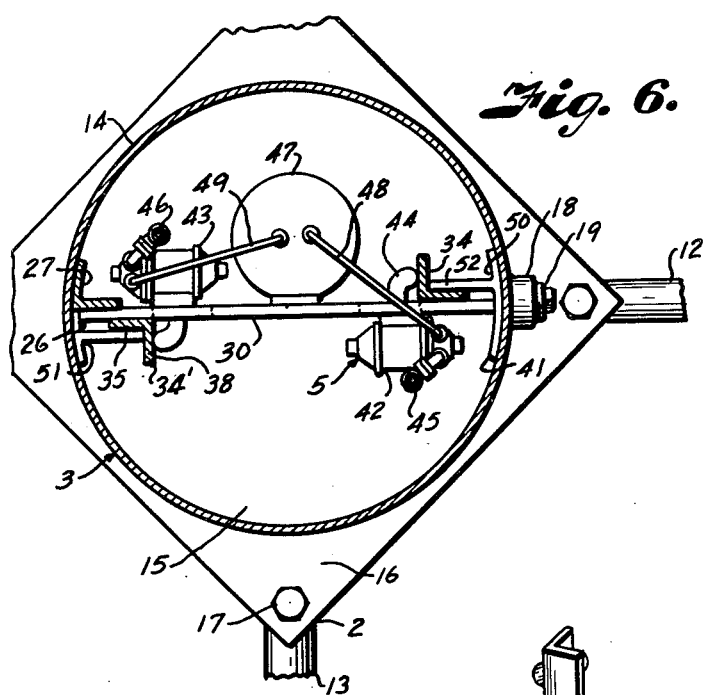
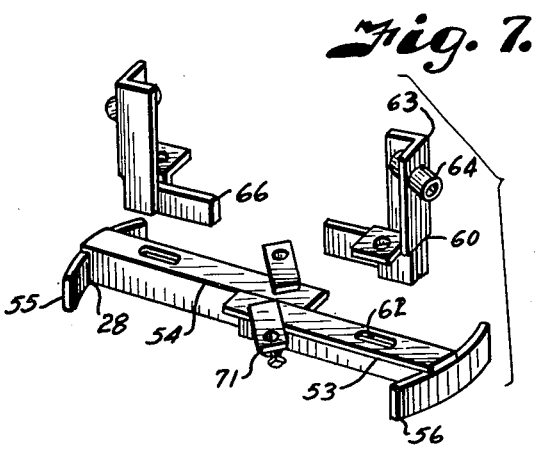
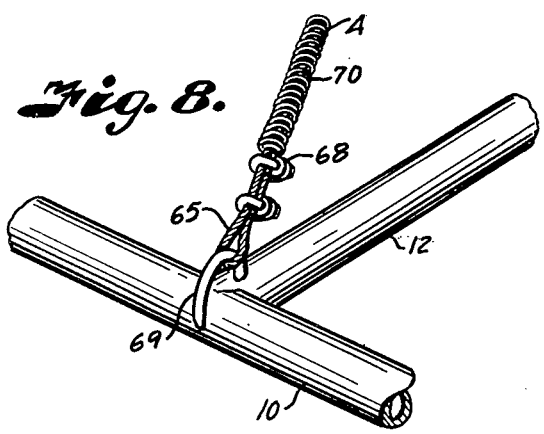
INVENTOR.
Robert E. Caldwell
BY
Fishburn & Mullendore
ATTORNEYS.

United States Patent Office 2,706,465
Patented Apr. 19, 1955

2,706,465

LIVESTOCK OILER AND APPLICATOR APPARATUS

Robert E. Caldwell, Lakin, Kans., assignor to Caldwell Manufacturing Company, Kearney, Nebr., a corporation of Nebraska Application March 18, 1953, Serial No. 343,191

3 Claims. (Cl. 119—157)

This invention relates to livestock oiling apparatus and more particularly to a mechanical livestock oiler and insecticide applicator which is automatically operated by stock rubbing against operative parts.

The objects of the invention are to provide livestock oiling apparatus which is self-contained and adapted for location in a field or other suitable accessible place for livestock so the stock can rub against operative portions of the apparatus; to provide apparatus with one or more operative portions that are flexible to conform to the body surface to be rubbed and oiled; to provide each flexible operative portion with a flexible coil or helical member extending therealong with the adjacent coils spaced for entry of the animal's hair therebetween to remove oil and insecticide from the flexible portions to the animal; to provide operative portions of flexible members with helical resilient members rotatable thereon whereby rubbing by an animal rotates said resilient members which auger the animal's hair to introduce the oil and insecticide in the hair and near the skin; to provide pumps and operating apparatus actuated by animals rubbing against the flexible operative portions to deliver a suitable volume of liquid medium, such as oil and insecticide, to the flexible operative portions for movement therealong and application to the animal during the rubbing; to provide an adjustable structure for regulating delivery of liquid medium to the flexible portions; to provide operating apparatus which supplies liquid medium to the flexible portions only during the time and to the extent that the flexible portions are rubbed by the animals whereby there is no flooding or waste of liquid medium when the apparatus is not in use; and to provide livestock oiling apparatus that is economical to manufacture, of strong, sturdy construction, positive in operation, and of large liquid medium capacity, which permits livestock to take care of the insect, pest and skin irritations themselves with a minimum of service.

In accomplishing these and other objects of the present invention, I have provided improved details of structure, the preferred form of which is illustrated in the accompanying drawing, wherein:

Fig. 3 is a vertical sectional view through the column reservoir and liquid medium supply operating mechanism.

Fig. 4 is an enlarged transverse sectional view through the center post on the line 4—4, Fig. 3.

Fig. 5 is an enlarged transverse sectional view through the center post on the line 5—5, Fig. 3.

Fig. 6 is an enlarged transverse sectional view through the center post on the line 6—6, Fig. 3.

Fig. 7 is an enlarged detail disassembled perspective view of the upper support and guides for the pump arms and flexible operative members.

Fig. 8 is an enlarged detail perspective view of the connection of the flexible members with the ends of the supporting base.

Figure 1:
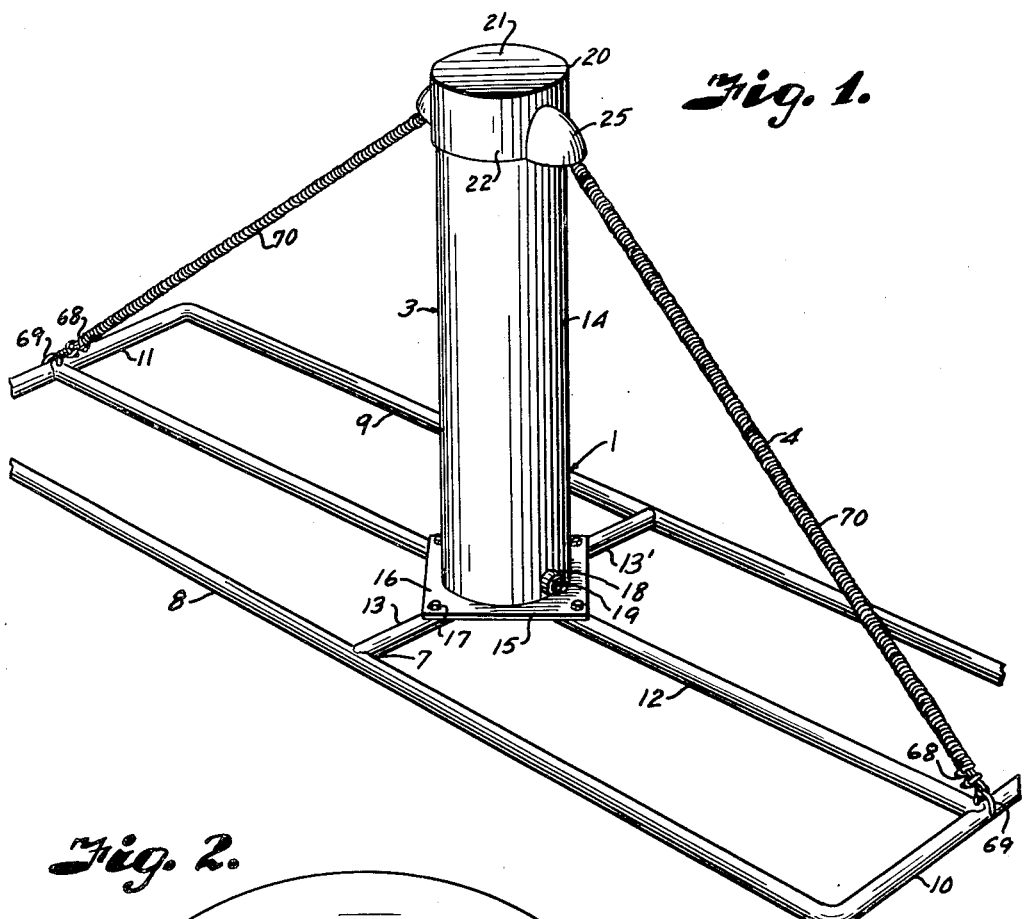
Fig. 1 is a perspective view of livestock oiling apparatus embodying the features of the present invention.
Figure 2:
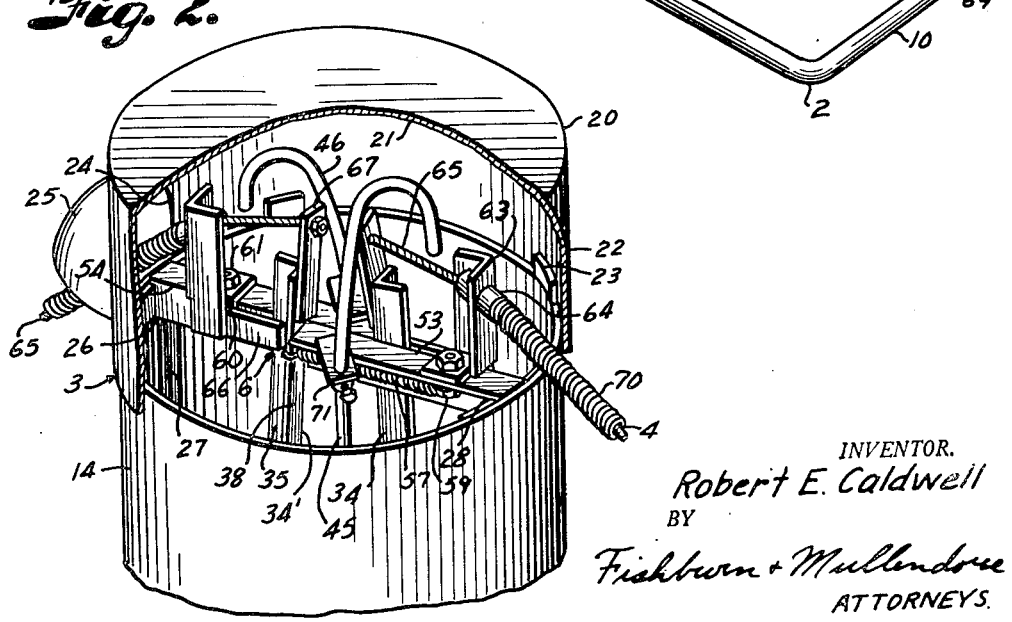
Fig. 2 is an enlarged perspective view of the upper portion of the livestock oiling apparatus with portions broken away to better illustrate the structure therein.

Referring more in detail to the drawings:

1 designates a livestock oiler generally consisting of a base 2, an upstanding reservoir and column 3, flexible rubbing elements or portions 4, liquid medium feed mechanism 5 and actuating mechanism 6 connecting the flexible elements and liquid medium feed mechanism.

The base 2 preferably consists of a plurality of elongated rigid members 7, such as pipe or the like, arranged in a substantially rectangular form extending over sufficient area to prevent overturning of the structure. In the base illustrated there are spaced parallel side members 8 and 9 connected at their ends by members 10 and 11, welded or otherwise suitably secured to the side members. A member 12 is arranged intermediate the side members 8 and 9 with the ends of said member 12 welded or otherwise suitably secured to the end members 10 and 11, and transverse members 13 and 13' are arranged intermediate the end members 10 and 11 with the ends of said transverse members suitably secured to the side members and intermediate member 12.

The reservoir or column 3 preferably consists of an upright cylinder defined by a peripheral wall 14, with the lower end closed by a bottom plate 15 suitably secured to the lower end of the wall 14 as by welding. The marginal edges of the bottom plate 15 extend outwardly from the wall 14 to define flanges 16 which are secured to the intermediate members 12 and 13 of the base by means of suitable fastening devices, such as bolts 17. The reservoir column has a drain connection 18 adjacent the lower end thereof, which connection is closed by a removable plug 19. The reservoir column has an open, upper end suitably closed by a removable cover 20, having a top wall 21 and a downwardly extending peripheral wall 22, the lower portion of which is sleeved over the upper portion of the wall 14, a plurality of lugs or the like 23 being arranged on the inside of the wall 22 and spaced from the lower edge of the wall 22 for engaging the upper edge of the wall 14 to support the cover thereon and limit the extent of telescoping of the walls 14 and 22.

The wall 22 of the cover is provided with openings 24 extending upwardly from the lower edge thereof and above the upper edge of the wall 14. In the illustrated structure there are two openings 24 diametrically opposed in the cover wall 22. Canopies 25 are secured to the cover wall 22 over and at the sides of the openings 24 whereby the operative members 4 may extend through the openings but the canopies 25 protect same against entrance of rain and the like.

The fluid supply means 5 and actuating means 6 are supported in the column reservoir by a frame 26 which includes an upright member 27 extending substantially from top to bottom of the column reservoir and secured in engagement with the interior of the wall 14 substantially in alignment with one of the openings 24 in the cover. Secured to the upright member 27 and extending substantially diametrically of the column reservoir is an upper support 28, an intermediate support 29 and a lower support 30, each of which is substantially in a diametric vertical plane which extends through the centers of the openings 24. The intermediate support 29 terminates short of the opposite side of the column reservoir and is provided with laterally spaced openings 31 through which pivot members such as bolts 32 extend to pivotally mount pump arms 34 and 34'. The pump arms are illustrated as angle members arranged on opposite sides of the support 29 with each of said arms having one flange 35 pivotally mounted on the respective bolt 32 and held in assembled condition by nuts 36, washers 37 preferably being interposed between the flanges 35 and the support 29.

The other flange 38 of each of the pump arms is toward the center of the reservoir column and extends laterally away from the support 29. The flanges 38 of the angle members are preferably reinforced by rods 39 which have their ends secured to the flange 38 adjacent the top and bottom supports with the center portions of said rods spaced from the flange by a brace 40 to provide a truss-like arrangement for the pump actuating arms. The lower support 30 preferably consists of a bar having one end secured to the upright member 27 and the other end provided with a shoe 41 which engages and preferably is suitably secured to the inner surface of the wall 14 on the opposite side from the upright member 27. The flanges 35 of the respective pump actuating arms slidably engage opposite sides of the lower support bar and suitable pumps 42 and 43 are mounted on the support bar with actuating levers 44 thereof positioned to be contacted by the lower portions of the flanges 38 of the respective pump actuating arms 34 and 34' respectively when said arms are oscillated on the bolts 32.

In the particular structure illustrated the pumps are such that when the levers 44 are moved toward the center of the column reservoir the pump will be actuated to move the material being pumped. When pressure is removed from the levers 44 they return to the other end of the stroke. Therefore, when the upper ends of the pump actuating arms are moved outwardly to move the lower ends of the pump actuating arms toward the center of the column reservoir the pumps 42 and 43 will be actuated to move liquid medium upwardly in discharge pipes 45 and 46 respectively. When the lower ends of the pump actuating arms are moved toward the sides of the column reservoir to release pressure on the levers 44 the return stroke of the pumps will draw liquid medium through a filter 47 and intake tubes 48 and 49 to the respective pumps. The reservoir column provides substantial liquid medium capacity and the pumps and intake therefor, being adjacent the bottom of the reservoir, assure the pumps remaining primed at all times ready for instant operation to deliver liquid medium. The quantity of liquid medium delivered is dependent upon the lengths of the pump strokes.

Angle guide members 50 and 51 are arranged on the lower support 30, each having a flange 52 spaced from the bar and arranged whereby the flange 35 of the pump actuating arms operates therebetween. The flanges 52 prevent excessive lateral movement of the lower ends of the arms and serve as stops to limit travel of the arms away from the pumps.

The upper support 28 is illustrated as being two angle members 53 and 54 suitably secured together with laterally directed flanges substantially in the same plane and depending flanges in face to face engagement. The angle member 54 is suitably secured to the upright member 27 and also has an arcuate shoe 55 engaging the inner face of the wall 14. The angle member 53 extends to the opposite side of the column reservoir and has a shoe 56 suitably secured on the end thereof and engaging the inner surface of the wall 14. The shoes 55 and 56 are suitably secured to the wall 14. The angle members terminate in spaced relation to the opposite sides of the reservoir column whereby the flanges 35 of the pump actuating arms 34 and 34' engage the faces of the depending flanges of the angle members 53 and 54 respectively, with the ends of the angles 53 and 54 cooperating with the members 50 and 51 to serve as stops to limit movement of the upper ends of the arms 34 and 34' toward the center of the column reservoir. The upper ends of the arms 34 and 34' are urged toward each other by springs 57, one end of the springs being connected to the respective arms and the other ends of the springs being connected to a portion 59 of brackets 60 or the mounting thereof. The brackets are adjustably secured to the angle members 53 and 54 by bolts or the like 61 which extend through slotted openings 62 arranged longitudinally in the laterally extending flanges of the angle members 53 and 54. The brackets have upstanding members 63 preferably provided with tubular guides 64 arranged at an angle to accommodate flexible members 65, such as cables, forming part of the operating portions 4. The brackets also include plates 66 spaced from the depending flanges of the angle members 54 and 55 whereby the flanges 35 of the pump operating arms 34 and 34' move between the plates 66 and the angle flanges and the upright portions 63 serve as stops to limit movement of the arms 34 and 34' on the pump actuating strokes. The mounting of the brackets by the bolts 61 and slotted openings 62 provides an adjustable structure to selectively position the upright portions 63 to regulate the swinging of the arms and delivery of the pumps.

Ears 67 are arranged on the upper ends of the arms 34 and 34' and the cables 65 suitably secured thereto, whereby each of the cables extends through the respective tubular guide 64, openings 24 and outwardly and downwardly at an angle to adjacent the end members 10 and 11 of the base 2. The outer ends of the cable members are suitably connected as by cable clamps 68 to loops 69 suitably secured to the end members 10 and 11. Loosely sleeved on the cables 65 are resilient, flexible animal rubbing members 70, each of which is preferably a helical coil. In the illustrated structure the rubbing members 70 are helical coil springs or the like which preferably extend from the cable clamp 68 to adjacent the tubular guides 64, however, a plurality of coil springs or the like helical members may be strung along the cables 65. The inside diameter of the rubbing members 70 is preferably larger than the cable whereby said rubbing members are free to rotate around said cables. Also the individual coils are spaced to permit the hair of an animal to extend therebetween.

The discharge pipes 45 and 46 of the respective pumps 42 and 43 extend upwardly through brackets 71 fixed to the upper support and the upper ends of said discharge tubes are turned downwardly whereby the liquid medium pumped by the respective pumps is discharged on the cables connected to the respective actuating arms 34 and 34', the discharge of the liquid medium preferably being upwardly of the cable relative to the tubular guides 64 whereby the liquid medium will run through the guides and down the cables and rubbing members when the flexible operating portions 4 are moved by livestock rubbing thereon.

In operating a livestock oiler constructed and assembled as described, the oiler is placed in a field or other suitable location and the column reservoir 3 substantially filled with suitable liquid medium such as oil and insecticide. Livestock rubbing against one of the rubbing elements 70 will flex same together with the cable 65 to apply a pull on the upper end of the respective pump actuating arm, swinging the arm on its pivot whereby the lower end of the arm moves the pump lever 44 to pump liquid medium upwardly through the respective discharge tube and discharge same on the respective cable. The liquid medium then runs through the tubular guide 64 and downwardly on the cable and into the rubbing member 70, the liquid medium slowly feeding by gravity through the coils of said rubbing member. As the livestock rubs the rubbing member, the animal's hair extends through the spacing of the coils and acts as a wick, whereby the rubbing action of the animal wipes liquid medium from the cable and effects a deposit of oil and insecticide in the spot the animal is rubbing. Also the rubbing tends to rotate the helical rubbing members on the cable whereby the spiral coils tend to auger up the animal's hair to effect penetration of the liquid medium next to the skin of the animal. When the animal stops rubbing, the pump operating members remain stationary and no further liquid medium is deposited on the cables until another animal starts rubbing one of the rubbing elements.

During inactivity of the rubbing elements downward flow of liquid medium on the cable and rubbing elements is retarded due to the tendency of the liquid medium to adhere to the spiral members of the cable and rubbing elements.

It is believed obvious that I have provided a livestock oiler and applicator apparatus that is sturdy of construction, economical to manufacture, and positive in operation to permit cattle to treat themselves.

What I claim and desire to secure by Letters Patent is:

1. A livestock oiling apparatus comprising, a base, an upstanding column fixed on the base and having a reservoir for containing a liquid medium, an elongated flexible cable member extending downwardly and outwardly from the column to the base at a point spaced from the column, a flexible helical coil rubbing element loosely surrounding a substantial length of the flexible cable member, said helical coil rubbing element having adjacent coils spaced whereby rubbing of an animal on the rubbing element rotates same on the flexible cable member and the helical coils auger up the hair of the animal and cause same to extend between the coils and the liquid thereon to penetrate close to the skin of the animal, and means operatively associated with said reservoir and said flexible cable member to deliver liquid from the reservoir onto the flexible cable member.

2. A livestock oiling apparatus comprising, an elongated base, a liquid reservoir having an upper portion spaced above the base, an elongated flexible cable member extending downwardly and outwardly from within the upper portion of the liquid reservoir and connected to the base in spaced relation to the reservoir, a flexible helical coil rubbing element loosely surrounding and rotatable on a substantial length of the flexible cable member, said helical coil rubbing element having adjacent coils spaced whereby rubbing of an animal on the rubbing element rotates same on the flexible cable member and the helical coil augers up the hair of the animal and causes same to extend between the coils and the liquid thereon to penetrate close to the skin of the animal, means operatively associated with the reservoir for delivering liquid from the reservoir onto the upper portion of the flexible cable member in the upper portion of the reservoir, and means operatively connected to the flexible cable member and actuated by flexing thereof for operating the liquid delivery means.

3. A livestock oiling apparatus comprising, an elongated base, a liquid reservoir having an upper portion spaced above the base, an elongated flexible cable member extending downwardly and outwardly from within the upper portion of the liquid reservoir and connected to the base in spaced relation to the reservoir, a helical coil rubbing element loosely surrounding a substantial length of the flexible cable member, said helical coil rubbing element having adjacent coils spaced whereby rubbing of an animal on the rubbing element rotates same on the flexible cable member and the helical coils auger up the hair of the animal and cause same to extend between the coils and the liquid thereon to penetrate close to the skin of the animal, liquid discharge means operatively associated with the reservoir to discharge liquid medium from the reservoir onto the upper portion of the flexible cable member in the upper portion of the reservoir for downward movement on the flexible cable member, means fixed in the upper portion of the reservoir and surrounding the flexible cable member below the discharge of the liquid medium for wiping excess liquid from said flexible cable member, and means operatively connected to the flexible cable member and actuated by flexing thereof for operating the liquid discharge means.

References Cited in the file of this patent

UNITED STATES PATENTS

| | | |
|---|---|---|
| 2,438,731 | Wedeking | Mar. 30, 1948 |
| 2,581,028 | Kirk | Jan. 1, 1952 |